UNITED STATES PATENT OFFICE 2,281,856

DIOCTYL CYANAMIDE AS AN INSECTICIDE

William Moore, Stamford, Conn., assignor to American Cyanamid Company, New York, N. Y., a corporation of Maine No Drawing. Application June 7, 1940, Serial No. 339,273

5 Claims. (Cl. 167—22)

The present invention relates to an insecticide and more particularly to a compound which is especially effective as a contact poison for the control of insect pests.

I have discovered that dioctyl cyanamide possesses powerful insecticidal activity against sucking and soft-bodied insects which are particularly difficult to exterminate, for example, the bean aphid and citrus red spider.

The following example illustrates a specific method of preparing the above compound in accordance with the invention. Materials employed are in parts by weight.

EXAMPLE 6.1 parts of cyanogen chloride were dissolved in 90 parts of benzene. After cooling the solution to 0° C.–5° C., 24.1 parts of dioctyl amine were gradually added with stirring. When this addition was completed, the mixture was agitated with a solution of 4 parts of sodium hydroxide dissolved in 20 parts of water, and allowed to stand one hour. The reaction mixture was washed with dilute hydrochloric acid and then with water. The water layer was removed and discarded. The solvent layer was dried with a small amount of anhydrous sodium sulphate. The benzene was removed by distillation under reduced pressure. The residue was vacuum distilled and the dioctyl cyanamide recovered having a boiling point of 172° C. at 1 mm. pressure.

Spray solutions were prepared by dissolving the dioctyl cyanamide in a solvent medium consisting of 65% acetone and 35% water. The following table shows the kills obtained under comparable conditions for the various dilutions when the sprays were applied to aphids and red spiders.

Table

| Insect | Dilution | Kill |
|---|---|---|
| | | Percent |
| Bean aphid | 1–500 | 95.5 |
| Citrus red spider | *1–4,000 | 100 |
| Do | 1–5,000 | 100 |
| Do | 1–10,000 | 92.2 |

*A 100% kill of the red spider eggs is obtained in conjunction with the 100% kill of the active forms.

This new insecticide may be applied in any of the conventional manners. Thus, for example, it may be used in an aqueous emulsion or it may also be incorporated in organic liquids such as the aliphatic and aromatic hydrocarbons for spraying purposes. It may be effectively used in dusts with such inert solid diluents as kieselguhr, wood flour, walnut shell, talc and the like.

Dioctyl cyanamide is a new chemical compound.

While the invention has been described with particular reference to specific embodiments, it is to be understood that it is not to be limited thereto but is to be construed broadly and restricted solely by the scope of the appended claims.

What I claim is:

1. An insecticidal composition including dioctyl cyanamide.

2. An insecticidal composition including dioctyl cyanamide incorporated in an organic liquid.

3. An insecticidal composition including dioctyl cyanamide incorporated in a solvent medium consisting of 65% acetone and 35% water.

4. An insecticidal composition including dioctyl cyanamide incorporated in an aqueous emulsion.

5. An insecticidal composition including dioctyl cyanamide incorporated in a dust selected from the group consisting of kieselguhr, wood flour, walnut shell and talc.

WILLIAM MOORE.